Feb. 24, 1959   T. S. ZAJAC   2,874,996
NOZZLE DEVICE
Filed Dec. 18, 1956

INVENTOR.
THEODORE S. ZAJAC
BY

United States Patent Office 2,874,996
Patented Feb. 24, 1959

2,874,996

NOZZLE DEVICE

Theodore S. Zajac, Parma, Ohio, assignor to Zalo Manufacturing Company, a corporation of Ohio Application December 18, 1956, Serial No. 629,181

6 Claims. (Cl. 299—150)

My invention relates to nozzle devices adapted to be connected to valved couplings.

An object of my invention is to provide a nozzle device adapted for the discharge of fluid from a coupling through which fluid, such as compressed air, is supplied.

Another object is the provision of a device through which compressed fluid, such as compressed air, may be discharged and which controls the flow of such fluid supplied to the device.

Another object is the provision of a nozzle device constructed to operate a spring-biased valve in a coupling to which the nozzle device is connected.

Another object is the provision of a unique combination of elements providing for the discharge of compressed fluid, such as compressed air, through a spout and for controlling the admission of such fluid to the device.

Another object is the provision of a structure which is economical to fabricate and which is efficient in use for the purpose of providing a nozzle through which fluid is discharged.

Another object is the provision of a novel nozzle device having control means utilizing a spring-biased valve mounted in a coupling to which the device is connected.

Another object is the provision of an improved nozzle device adapted to be detachably connected to a female coupling and which yieldably resists rotation of the device relative to the axis of the coupling.

Another object is the provision of a nozzle device which is peculiarly adapted to accommodate itself to the structure of female couplings having spring-biased valves therein.

Other objects and a fuller understanding of my invention may be had by referring to the following description and claims, taken in conjunction with the accompanying drawing, in which:

Figure 2:
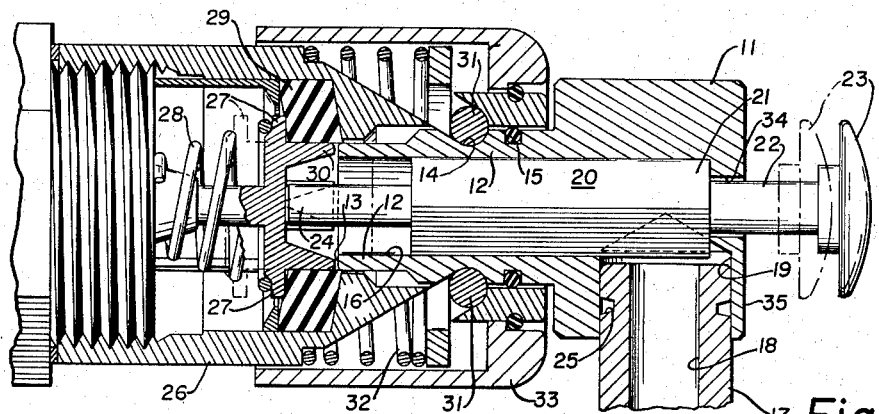
Figure 2 is a longitudinal sectional view of my nozzle device connected to a female coupling mounted to the terminus of a fluid line, such as a hose.

My device incorporates a body 11 preferably of metal, which is of generally cylindrical form. This body 11 has a male extending portion 12 protruding forwardly from one axial end of the body 11 and which is disposed in axial alignment therewith. The male portion 12 has an open forward end 13. The opening from the forward open end 13 extends rearwardly to form the cylindrical bore or opening 16. This bore 16 extends axially through the male portion 12 and into the body 11 to adjacent the rear wall of the body 11.

Concentrically disposed around the outer cylindrical wall of the male portion 12 is an annular groove 14. As seen in Figure 2, the outer wall of the male portion 12, beginning at the forward end 13, is cylindrical, and then gradually increases in diameter to where it again gradually decreases in diameter to form the annular groove 14. At a location between the groove 14 and the maximum diameter of the body 11, there is a small annular groove in which there is located an O-ring 15 of rubber or rubber like material, such as one of the synthetic rubbers. The O-ring 15 is of a nature as to be yieldable and yet which frictionally engages metal or other hard substance in rubbing or sliding engagement therewith.

Extending radially of the body 11, there is provided an opening 19 which extends radially inward to communicate with the axial bore 16. A spout or discharge member 17 having an opening 18 extending therethrough along its length has an end mounted in this radial opening 19. There is a press fit of the spout member 17 in the radial opening 19. To provide for securing locking of the spout member 17 to the body 11, there is provided an annular groove 25 adjacent the inward end of the spout member 17. At a location such as location 35, the metal is peened or otherwise pressed inwardly to interlock with the groove 25 and thus to resist removal of the spout member 17 from the body 11. The outer or free end of the spout member 17 is tapered as illustrated and the opening 18 through the spout member 17 is somewhat restricted at this outer tapered end. At the free or outer end of the spout member 17, the opening 18 communicates with atmosphere so as to there provide a discharge outlet or orifice through which fluid entering the axial bore 16, and hence out through the opening 18, may be discharged to atmosphere.

An actuating member denoted generally by the reference character 20 is positioned to extend axially of the body 11 and its male portion 12. This actuating member 20 has a non-circular portion 21 which is accommodated within the cylindrical bore 16 and thus provides a fluid passageway along the non-circular portion 21 within the bore 16. The actuating member 20 has extending forwardly therefrom a cylindrically shaped forward portion 24 which protrudes forwardly of the forward end 13 of the male portion 12. The forward protruding portion 24 is disposed axially of the male portion 12 and the cylindrical bore 16 therein.

Figure 1:
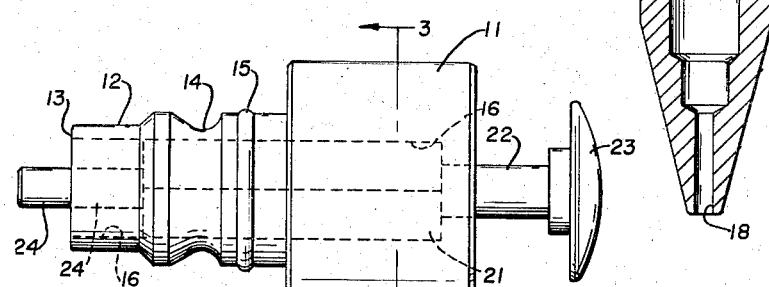
Figure 1 is an elevational view of a side of my improved nozzle device.
Figure 3:
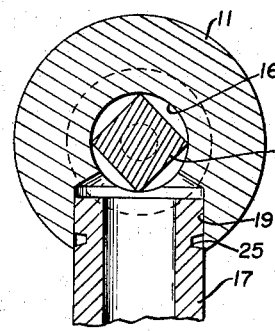
Figure 3 is a cross-sectional view taken through the line 3—3 of Figure 1.

The actuating member 20 also has a rearwardly extending stem portion 22 of generally cylindrical shape and smaller in cross-section than the non-circular portion 21. A small hole 34 extending through the rear wall of the body 11 accommodates the portion 22 so as to permit axial sliding of the portion 22 through the small hole 34. A button 23 is press fitted upon the outer end of the stem portion 22 so as to be firmly engaged thereto. The button 23 is adapted to be engaged by the thumb or hand so as to manually move the actuating member 20 forwardly, that is, toward the left in Figures 1 and 2. It is noted that while the actuating member 20 is accommodated within the bore 16, fluid entering the bore 16 from the forward open end 13 is free to flow through the bore 16 and hence out through the opening 18 to be discharged from the orifice at the free end of the spout member 17.

My nozzle device is adapted to be connected or coupled to female coupling members having a spring-biased valve member incorporated therein which female couplings may incorporate quick-detachable connecting means, such as balls or cylindrical bars provided to lockingly engage in the grooves of a male connecting element. My device is such that it is adapted to be connected to and be utilized with female connecting members of various designs and constructions. I have illustrated my nozzle device in the view of Figure 2 as connected to a female coupling member similar in construction to that illustrated in my co-pending patent application filed concurrently herewith and entitled, "Valved Coupling," Serial No. 629,072 filed December 18, 1956. It is understood, however, that my nozzle device may be connected to and utilized with other valved couplings.

In the valved coupling illustrated herein, there is shown a female coupling body 26 of generally cylindrical shape having an opening extending axially therethrough from an open end adapted to receive a male element. The female coupling embodies a spring-biased valve member 27 movable between open and closed positions relative to an annular sealing member 29 and which is spring-biased to a closed position by a coil spring 28. The forward end portion 30 of the valve member 27 is castellated to provide a plurality of forwardly extending fingers or prongs which fit into the cylindrical opening within the annular sealing member 29. There are provided spaces between the individual prongs or fingers of the castellated portion 30 through which fluid may flow when the valve member 27 is in its open position shown in broken lines in Figure 2.

There are a pair of cylindrically shaped locking bars 31 carried by the female coupling body 26 and which are arranged to move both longitudinally and radially relative to the body 26 so as to move in and out of the annular groove 14 of the male portion of my nozzle device. A coil spring 32 within an actuating sleeve 33 is provided for the actuation of the locking bars 31. The force of the springs 32 tends to hold the locking bars 31 within the annular groove 14. Actuation of the sleeve 33 permits the locking bars 31 to move radially outward so as to disengage the annular groove 14 of the male portion 12 inserted within the hollow opening in the coupling body 26.

To resist free swinging or rotation of the nozzle device relative to the coupling in which the male portion 12 is inserted, the O-ring 15 of rubberlike material extends radially outward of the male portion 12 a sufficient distance to engage the internal wall of the cylindrical opening in which the male portion is inserted. The protrusion of the O-ring 15 radially outward is such that the male portion 12 may be readily slid into the hollow cylindrical opening in the female coupling 26 by sliding the O-ring against the inner cylindrical wall of the coupling in which the male portion 12 is inserted. However, by the yieldable resistance of the rubberlike material of which the O-ring is constructed, there is a resiliently yieldable resistance to free turning of the round male portion 12 within the cylindrical opening of the coupling. In the use of my nozzle device, it is usually desirable to avoid a free swinging movement of the nozzle member relative to the coupling.

My nozzle device is particularly useful where a jet of compresesd air is desired, such as in a machine shop where it is desired to blow away chips, dust or other undesirable material from a location. Other nozzle devices have required a large and more complex construction, and have incorporated valves with appropriate valve operating controls as part of the nozzle device. I have made a lightweight and efficient nozzle device which utilizes the structure and function already present in a coupling to which the device is connected. For example, I avoid the requirement for constructing a valve in my device as I utilize the valve presently in the valved coupling to which my device is connected.

To mount my device to a female coupling, the male portion 12 is moved axially into the opening of the female coupling to the position shown in Figure 2. In this operation, the locking bars 31 interlock with the annular groove 14 so that my device is detachably interlocked with the coupling. The O-ring 15, while permitting insertion of the male portion 12 into the coupling, performs the function of yieldably resisting free swinging or rotation of my device relative to the coupling. The extreme forward end of the forward portion 24 of the actuating member 20 is positioned adjacent or in engagement with the valve member 27 at the axis of the valve member, as illustrated in Figure 2. In this position, the valve member 27 is closed by the spring 28. To obtain a discharge of fluid, such as compressed air, the button 23 is manually depressed so as to move the button from its position shown in full lines to its position shown in broken lines in Figure 2. Forward movement of the actuating member 20, that is, to the left in Figure 2, presses the valve member 27 to its open position shown in broken lines in Figure 2. To move the valve member 27 to its open position, the bias of the spring 28 is overcome by the forward movement of the forward stem portion 24 pressing the valve member 27 inward of the coupling. As soon as sufficient fluid, such as compressed air, has been discharged, then the button 23 is no longer depressed and the resilient bias of the spring 28 urges the valve member 27 back to its closed position. The valve member 27 is engagement with the forward stem portion 24 moves the actuating member 20 outwardly, that is, to the right in Figure 2, and thus back to the position shown in full lines in Figure 2. The forward end 13 of the male portion 12 abuts in sealing engagement the annular sealing member 29 which is of resilient rubber or rubberlike material so as to provide a good seal with the end 13 of the male portion 12. It is understood, of course, that the same female coupling member may be utilized with other devices, such as devices having a male portion which protrudes into the opening within the annular sealing member 29 and which engages the castellated protruding portion 30 to open the valve member 27.

The present disclosure includes that contained in the appended claims, as well as that of the foregoing description.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A nozzle device adapted to be connected to a coupling member having a reciprocal valve head biased to closed position and adapted to be opened by being pressed against said bias, said coupling member having an open end and radially movable locking means associated therewith adjacent said open end, said nozzle device comprising the combination of a hollow body, said body having an open-ended male portion adapted to be inserted in the open end of a said coupling to provide communication between the interior of the said coupling and said body, said body having a substantially straight opening extending axially thereof from the open end of said male portion, said male portion having an outer grooved wall adapted to be engaged by the locking means of a said coupling for ready attachment and detachment of the male portion to said coupling, said male portion having a friction portion extending radially outwardly therefrom to frictionally engage said coupling member for limiting rotation of said male portion relative to said coupling member, said body having a spout portion extending radially thereof, said spout portion having an opening extending therethrough communicating with said axially extending opening and extending to an open end, and an actuating member positioned in said axially extending opening in said body and disposed longitudinally thereof, said actuating member having a fluid passageway therethrough along said axial opening to permit flow of fluid along the actuating member through said axial opening, said actuating member being in a sliding fit with said body and having an operating portion extending from a first end thereof externally of said body to provide for slidable reciprocal movement of the actuating member from outwardly of said body, said actuating member having a protruding portion extending from an opposite end thereof and protruding externally of said open-ended male portion, said protruding portion being axially aligned with said male portion and being adapted to engage the valve head of a said coupling member to which the said male portion is adapted to be connected, the operation of said operating portion to move the actuating member forwardly in said axial opening toward a said coupling adapted to be connected to said male portion causing said protruding portion to press against said valve head in opposition to said bias and to open said valve, fluid entering said axial opening from said coupling being discharged through said spout portion.

2. A nozzle device adapted to be mounted to a coupling member having a valve movable axially thereof and spring-biased to closed position, said coupling having radially movable locking means associated therewith adjacent an open end thereof, said coupling having an opening extending from said open end axially of said valve, said nozzle device comprising the combination of a body having a longitudinal opening extending axially thereof, said body having an open-ended male portion adapted to be inserted into said open end of a said coupling, said male portion having a portion adapted to frictionally interfit with said coupling to provide for frictionally limited rotation of the said male portion in a said coupling, said male portion having a relieved outer wall adapted to receive said movable locking means of a said coupler for the detachable interlocking of the nozzle device to a said coupling, said body having an outlet conduit communicating with said longitudinal opening at a longitudinal distance from the forward end of said male portion, said conduit extending laterally from said longitudinal opening to an outlet opening, and an actuating member carried by said body in sliding fit therewith and extending axially of said longitudinal opening, said actuating member having a valve-engaging portion protruding in a first direction from said open-ended male portion to engage the valve of a said coupling to which the nozzle device is mounted, said actuating member having an operating portion protruding from said body in an opposite direction, said operating portion having a button portion adapted to be manually pressed in a longitudinal direction for moving said operating portion, said actuating member having a connecting portion interconnecting said valve-engaging portion and said operating portion and extending along said longitudinal opening of said body, said connecting portion having a cross-sectional solid area less than the cross-sectional area of said longitudinal opening in the body to provide a fluid passageway through said longitudinal opening between the open end of said male portion and the said outlet conduit, the manual operation of said actuating member by pressing of said button portion moving said valve-engaging portion to engage and open the valve of a said coupling to which the nozzle device is mounted and fluid from said coupling being admitted thereby to said body and discharged therefrom through said outlet conduit.

3. A nozzle device adapted to be coupled with a female coupling member having an axially disposed open space therein and extending to an open end, said coupling having a valve movable along the axis of said open space and spring-biased to closed position, said nozzle device comprising in combination, a longitudinal body having a longitudinally disposed opening therein extending from an open forward end thereof, said open forward end being adapted to be inserted by axially directed movement in a said female coupling to communicate with the open space therein, said body having a rubber-like portion adapted to frictionally engage said coupling to permit frictionally limited rotation of the body relative to said coupling, said body having a spout portion extending therefrom at an angle to the axis thereof, said spout portion having a duct therein communicating with said longitudinally disposed opening and terminating in an outlet, and a stem member carried by said body in a longitudinally slidable fit therewith and extending longitudinally of said body through said longitudinally extending opening, said stem member protruding forwardly of said open forward end and being adapted to engage the valve of a said coupling in which said open forward end is inserted, said stem member also protruding rearwardly through said body to be actuated from the exterior of said body, the said stem member being reciprocal relative to said body, actuation of said stem member to move the stem member in a forward direction engaging a valve of a said coupling in which said forward end is adapted to be inserted and pressing the valve to open position, said stem member in said longitudinally extending opening having an effective cross-sectional area less than the cross-sectional area of the said longitudinally extending opening to permit fluid from a said coupling to pass through said longitudinally extending opening to be discharged therefrom through said spout portion.

4. A nozzle device comprising a body having a male portion extending axially thereof, said male portion being adapted to be inserted in a female coupling having a cylindrical opening therein, having locking means radially movable in and out of said cylindrical opening, and having a valve reciprocally movable in said coupling along the axis thereof and spring-biased to closed position, said male portion having a cylindrical portion positionable in the said cylindrical opening of a said coupling and concentric with the walls of said cylindrical opening, said male portion having a grooved portion adapted to accommodate said locking means for coupling the nozzle device to said coupler, an annular member of rubberlike material carried on said male portion and concentric therewith, said annular member extending radially outward of said cylindrical portion to frictionally engage the wall of said cylindrical opening of a said coupling for limiting free rotation of the male portion in said cylindrical opening, said body having a longitudinal opening extending from the forward end of said male portion and axially of said cylindrical portion, a spout member carried by and extending laterally of said body at an angle to the axis of said cylindrical portion, said spout portion having a duct extending therethrough communicating with the said longitudinal opening and terminating in an outlet, and an actuating member extending through said body and longitudinally of said body opening, said actuating member having a forward portion protruding forwardly of said male portion and disposed axially of said cylindrical portion of the male portion, said actuating member having a rearward portion protruding rearwardly of said body and disposed axially of said cylindrical poriton of the male portion, inward movement of said rearward portion moving said forward portion forwardly to engage and move to open position the spring-biased valve in a said coupling in which the said male portion is inserted, said actuating member in said longitudinal opening having a fluid passageway extending therealong to permit fluid to pass through the longitudinal opening from said forward end to said duct, the opening of a valve in a said coupling by said actuating member permitting fluid from said coupling to flow through said device from said forward end and discharged through said outlet.

5. A nozzle device adapted to be coupled to a coupling having a spring-biased valve axially movable in an opening extending from an open end of the coupling, the said coupling adjacent said open end having a cylindrical inner wall and having movable locking members movable radially inward and outward of said opening, said device comprising a body having a conduit extending therethrough, said conduit having a first portion and a second portion, said first portion being arranged along an axis and said second portion being arranged to extend out from said first portion at an angle to said axis, said body having a male portion insertable in the opening of a said coupling, said male portion having a cylindrical portion adapted to be concentrically mounted within said cylindrical inner wall of a said coupling, a ring of rubber-like material mounted on said male portion to engage the said cylindrical wall of a said coupling to yieldably and frictionally resist rotation of the male portion within said cylindrical wall, said male portion having a recessed portion adapted to cooperate with the locking members of a said coupling to lock the male portion in the opening of a said coupling, and a longitudinal member extending through said body axially of said first portion of the fluid passageway to protrude forwardly of said male portion and axially of said cylindrical portion thereof, said longitudinal member extending rearwardly through said body along the said axis to provide for manually moving the longitudinal member in a forward direction and outwardly of said male portion, forward movement of the longitudinal member along said axis providing for engagement by the longitudinal member of a valve of a coupling in which the said male portion is inserted and the opening of the valve to permit fluid to flow from the coupling through said fluid passageway, the walls of the first portion of the passageway and the said longitudinal member being arranged relative to each other to permit fluid to pass along the longitudinal member through said passageway.

6. A device for controlling and directing the flow of fluid delivered through a hollow female coupling having an axially movable valve spring-biased to closed position within the hollow coupling at an axial distance from the open end of the coupling and having radially movable locking members mounted on the coupling adjacent the said open end for interlocking with a male element inserted into the coupling through said open end, said device comprising the combination of, a body, a male element extending from said body, said male element having a recessed wall adapted to interengage with the locking members of a said coupling in which the male element is inserted, a spout element extending from said body at an angle to the axis of said male element, said body and male element having a first opening extending therein from a forward open end of the male element, said body and spout element having a second opening extending therein from said first opening to an open end of the spout element, said male element being adapted to be inserted into a said coupling through the open end of the coupling to axially align and place in intercommunication said first opening of the male element and the said hollow coupling, a friction member mounted on said male element to frictionally engage a said coupling in which the male element is inserted and to resist relative rotation between the male element and coupling, and an actuating element extending through said body and male element and disposed in said first opening, said actuating element having a forward portion extending forwardly out of the forward open end of the male element and in alignment with said first opening, said forward portion being adapted to extend into a said hollow coupling in which the male element is inserted to engage the said valve thereof, said actuating element also having a rearward portion extending rearwardly out of the body and in alignment with said first opening, said rearward portion being adapted to be manually pressed forwardly to move said forward portion against the said valve of a said hollow coupling in which the male element is inserted to thereby move the valve thereof to open position, the arrangement providing for flow of fluid from a said coupling into the open end of the male element through said first and second openings of the device and the discharge of said fluid through the open end of the spout element.

References Cited in the file of this patent

UNITED STATES PATENTS

| | | |
|---|---|---|
| 104,025 | Harvey | June 7, 1870 |
| 2,709,093 | Zeeb | May 24, 1955 |
| 2,730,382 | Mastri | Jan. 10, 1956 |
| 2,735,696 | Omon et al. | Feb. 21, 1956 |